Sept. 25, 1962     A. G. COX     3,055,314
VEHICLE CONSTRUCTION
Filed Jan. 26, 1960     3 Sheets-Sheet 1

INVENTOR
AUSTIN G. COX
BY Strauch, Nolan & Neale
ATTORNEYS

Sept. 25, 1962 A. G. COX 3,055,314
VEHICLE CONSTRUCTION
Filed Jan. 26, 1960 3 Sheets-Sheet 2

INVENTOR
AUSTIN G. COX

Strauch, Nolan & Neale
ATTORNEYS

Sept. 25, 1962    A. G. COX    3,055,314
VEHICLE CONSTRUCTION
Filed Jan. 26, 1960    3 Sheets-Sheet 3
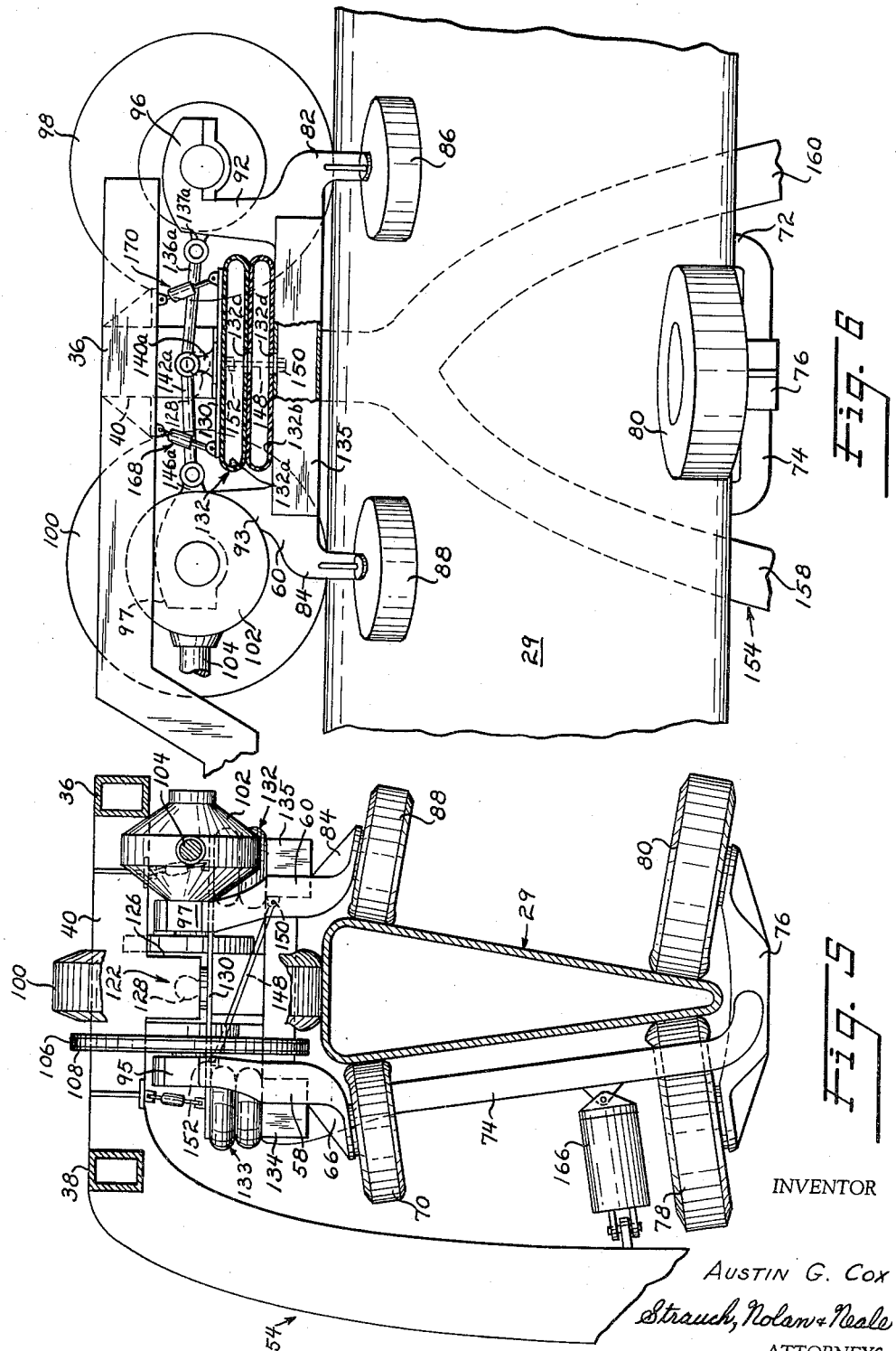
INVENTOR
Austin G. Cox
Strauch, Nolan & Neale
ATTORNEYS

United States Patent Office 3,055,314
Patented Sept. 25, 1962

3,055,314
VEHICLE CONSTRUCTION
Austin G. Cox, Houston, Tex., assignor to Alwac International, Inc., Nassau, Bahamas, a corporation of Panama
Filed Jan. 26, 1960, Ser. No. 4,719
4 Claims. (Cl. 105—150)

This invention relates to monobeam suspended vehicles and more particularly to improved suspensions for such vehicles.

While in certain aspects the invention is of general utility in the field of monorail transportation, the invention is primarily directed to improvements in monorail systems of the type in which the passenger or cargo carrying vehicle is suspended below the track from a compact drive unit which travels along the top of the track. The monorail systems of the present invention are capable of transporting passengers or cargo or both with a speed and economy which is not approached by conventional systems.

Although monorail systems have been in limited operation for a number of years and their advantages have long been known, they have not met with widespread acceptance. In large part, the failures of such prior systems to achieve acceptance has been due to the relatively high cost and complexity of both the vehicles and the monorail tracks. Problems have also been encountered in providing a stable, comfortable ride particularly at relatively high speeds.

It is accordingly an important object of the present invention to provide significant improvements in vehicles for monorail systems and to provide vehicles which are of relatively simplified, light weight construction and which cooperate with the monobeam in a unique manner to stabilize the vehicle and permit the smooth, stable high speed passage of the vehicle along the monobeam.

More specifically, it is an object of the present invention to provide improved systems for suspending the passenger or cargo carrying vehicles from the drive components and supporting trucks or bogies.

It is a further object of the present invention to provide improved monobeam supported bogie constructions and suspension systems which substantially reduce the stresses applied to the vehicle bodies per se and thus permit a substantial reduction in the weight of the vehicles.

These and other objects and advantages of the present invention will become more fully apparent by reference to the appended claims and as the following detailed description proceeds in connection with the accompanying drawings in which:

FIGURE 5 is a transverse section taken along line 5—5 of FIGURE 4; and

FIGURE 6 is an elevation of the side of the bogie unit opposite the side shown in FIGURE 4.

Figure 1:
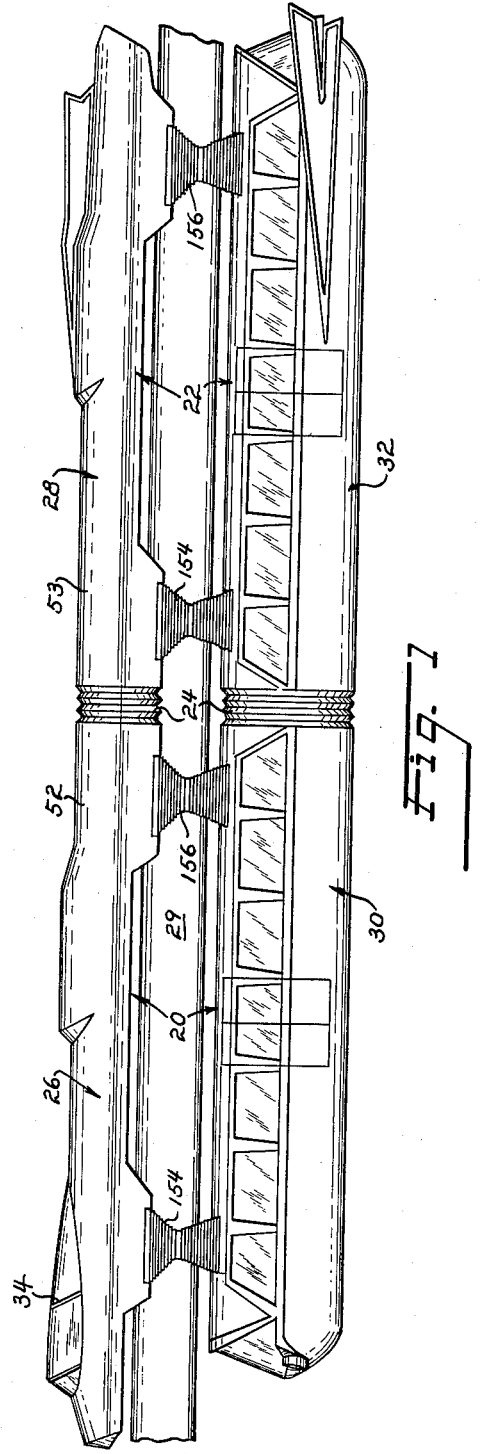
FIGURE 1 is a side elevation of a monorail vehicle and track constructed in accordance with the present invention.

Referring now more particularly to the drawings, FIGURE 1 illustrates a typical train unit for the present invention which comprises two vehicle units indicated generally at 20 and 22, respectively, connected by a flexible unit 24 to permit articulation of the two main units. While two vehicle units have been shown, it will be understood that a train in accordance with the present invention may be made up of any desired number of separate units. Vehicle units 20 and 22 comprise upper drive units 26 and 28, respectively, which travel along the upper surface of the track 29 and lower load carrying units 30 and 32, respectively, suspended below the track and which in the form of the invention shown are adapted to carry passengers, although they also may be cargo carrying units. The forward upper unit 26 is provided with an operator's compartment 34 from which the operation of the entire train can be controlled. Apart from the provision of the driver's compartment in the unit 26, and other differences in external appearance, the front and rear assemblies 20 and 22 are of substantially identical construction. Accordingly, only the forward unit 20 will be described in detail.

The upper unit 26 comprises an elongated rigid chassis frame structure including side rails 36 and 38 to which cross members 40, 42, 44, 46 and 48 are rigidly secured as by welding. The chassis structure is completed by diagonal brace members 50 and 51 to provide a strong, lightweight rigid structure which is resistant to bending and twisting.

The body shells 52 and 53 which are of conventional construction are mounted in the usual manner on the chassis units and will not be described in detail.

The chassis units of the front and rear vehicles 20 and 22 are detachably coupled by a conventional unit 55, the details of which do not form a part of the present invention.

Figure 3:
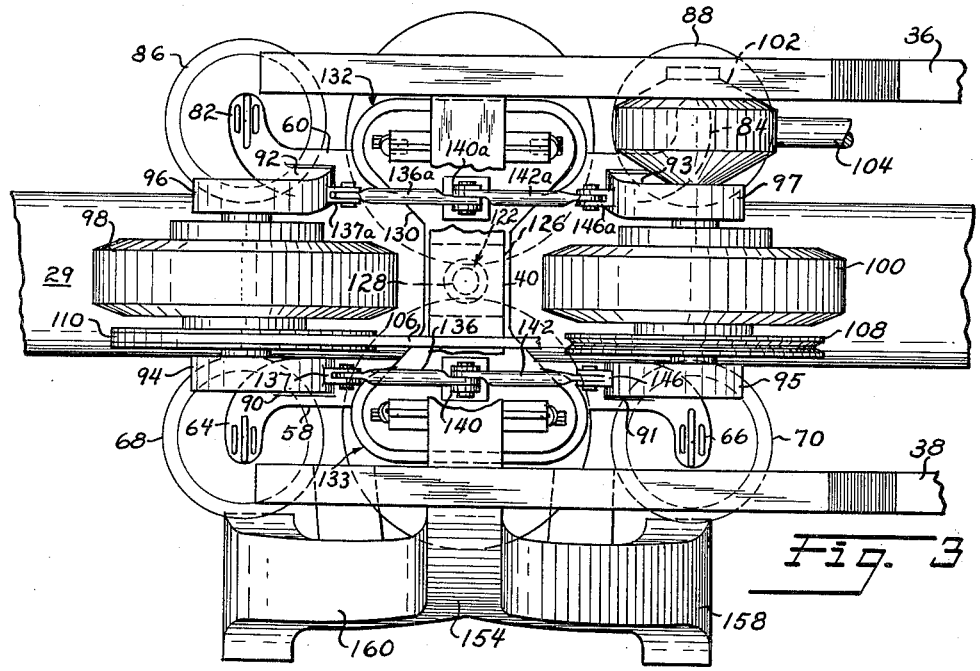
FIGURES 3 and 4 are top and side elevations, respectively, of one of the bogie constructions for supporting the vehicle for passage along the monorail track.
Figure 4:
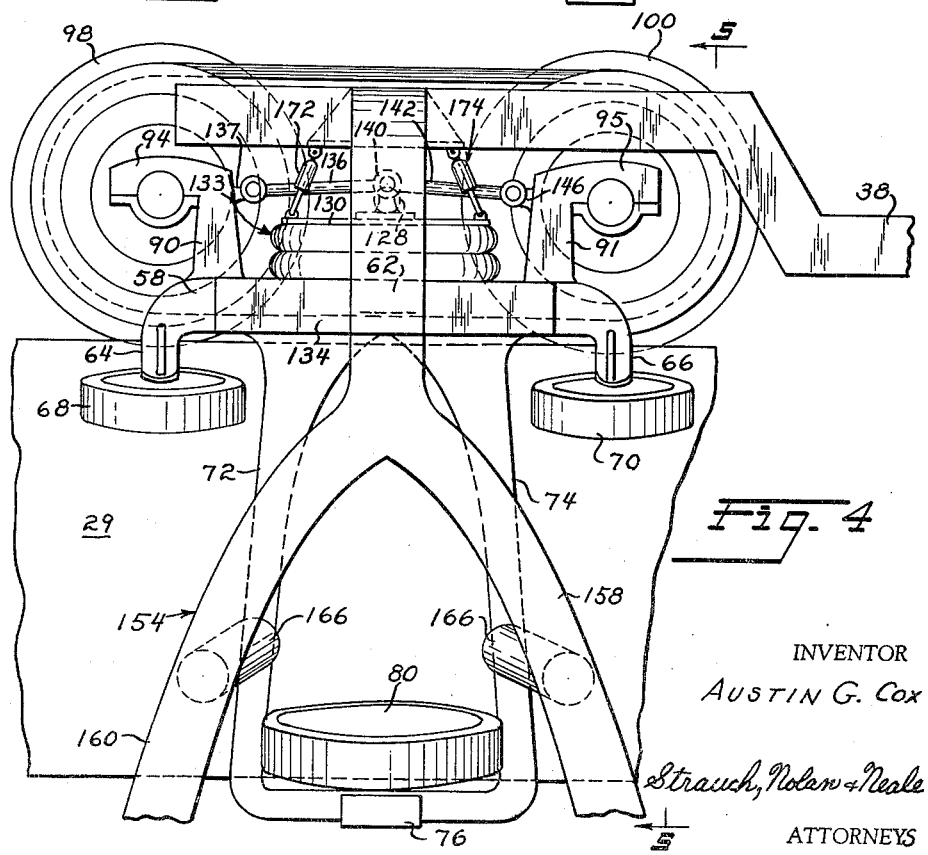

As best shown in FIGURES 3, 4 and 6 the end portions of the members 36 and 38 to which the cross members 40 to 48 are welded are relatively raised to accommodate identical front and rear bogie assemblies indicated generally at 54 and 56, the former being illustrated in detail in FIGURES 3 through 6 to which detailed reference will now be made. The bogie assembly 54 comprises side frame assemblies 58 and 60 (FIGURE 3) positioned at opposite sides of the track 29, the central portions of which are joined by a rigid cross frame member 62 (FIGURE 4) which extends across the top of the track 29. The frame assembly 58 is provided with a pair of downwardly projecting arms 64 and 66 which rotatably support front and rear side guide wheels 68 and 70, respectively, which engage one side of the track adjacent the upper edge thereof. Also formed integrally with the side frame assembly 58 are a pair of downwardly projecting arms 72 and 74 which are rigidly joined at their lower ends to a plate-like wheel mounting assembly 76 (FIGURES 4 and 5) which rotatably supports a pair of lower guide wheels 78 and 80 which are adapted to engage the opposite side surfaces of the track adjacent the lower edge thereof.

At its opposite ends the side frame assembly 60 is provided with a pair of downwardly projecting arms 82 and 84 (FIGURES 3, 5 and 6) which rotatably support side wheels 86 and 88 for engagement with the side surfaces of the track 29 opposite the respective wheels 68 and 70. Also formed on the side frame assemblies 58 and 60 are pairs of upwardly projecting arms 90 and 91 and 92 and 93 which are provided respectively with cantilever supports 94, 95, 96 and 97 for the main load carrying and drive wheels 98 and 100, respectively. Preferably all of the track engaging wheels are provided with conventional pneumatic tires.

Figure 2:
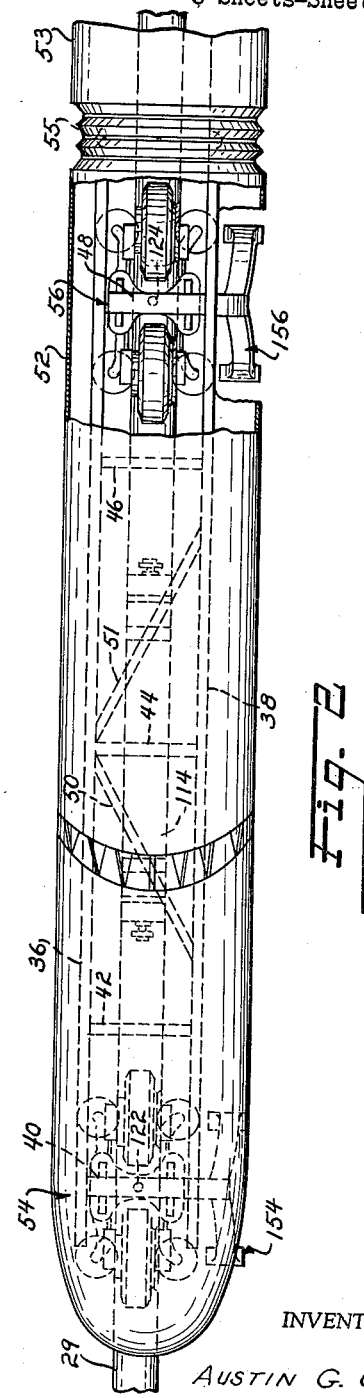
FIGURE 2 is a fragmentary top plan view of the vehicle and track of FIGURE 1 with parts broken away to show interior detail.

Also carried by the mount assembly 96 is a gear housing 102 which transmits torque from a drive shaft 104 to the wheel assembly 100. Preferably the rear wheel 100 is drivingly connected to the front wheel 98 by drive belt 106 carried by pulleys 108 and 110 rigid with the respective wheels 100 and 98. The drive shaft 104 is connected through a universal joint (not shown) to a drive shaft driven by a gasoline or diesel engine or other suitable prime mover 114 (FIGURE 2) suitably mounted on the main chassis frame structure. A similar drive connection is made to the rear bogie assembly 56.

The main chassis assembly is mounted on the bogie assemblies 54 and 56 by identical ball and socket assemblies 122 and 124, respectively. The centers of assemblies 122 and 124 are coplanar with or below the plane defined by the axes of rotation of the support wheels 98 and 100 between which they are interposed. A socket portion of the assembly is formed by a member 126 (FIGURE 5) projecting downwardly from the central portion of the end cross member 40. The ball member 128 is rigid with the central portion of an intermediate plate 130, the opposite ends of which are suspended on pneumatic spring and shock absorbing assemblies 132 and 133, the lower ends of which in turn are supported by hollow air tight tubes 134 and 135 rigidly attached to the side frame assemblies 58 and 60. The pneumatic spring assemblies 132 and 133 are longitudinally elongated two compartment bellows type expansible chambers arranged to permit restricted vertical movement between the plate 130 and the remainder of the bogie assembly but are provided with suitable internal structure (not shown) to limit relative movement between the parts in a direction laterally or longitudinally of the track 29. The internal mechanisms are not of sufficient strength to assure proper stability of the system particularly when forces due to acceleration or deceleration are high. The assemblies 132 and 133 are of identical construction and comprise upper and lower longitudinally elongated chambers 132a and 132b, chamber 132b being in fluid communication with chamber 132a through aperture 132c and with the hollow fixed volume interior of tube 135 through aperture 132d. The walls of chambers 132a and 132b are formed of a suitable, preferably internally reinforced elastomeric material and with the exception of apertures 132c and 132d are imperforate and airtight.

A stabilizer linkage system of unique construction, which will now be described in detail, is provided to stabilize plate 130 longitudinally and laterally relative to members 58 and 60. Referring to FIGURE 4, the linkage system, which absorbs acceleration and deceleration inertia loads, comprises a rigid link 136 pivotally mounted by a rubber snubber at one end on a lug 137 rigid with the bogie frame member 58 and pivotally connected at its opposite end to a rubber snubber equipped lug 140 projecting upwardly from the topside of the plate 130 laterally opposite and slightly above the center of the ball member 128. A similar linkage system comprising a link 142 and a rubber snubber equipped mounting lug 146 connects the plate 130 to the rearward portion of the bogie. Identical linkage systems bearing the same reference numerals with the suffix a are provided at the opposite side of the bogie to connect the plate 130 and the bogie frame member 58.

Lateral stabilization is effected by a link 148 (FIGURE 5), one end of which is pivotally carried by a rubber snubber equipped lug 150 rigid with a member 60 and the opposite end of which is pivotally carried by a rubber snubber equipped lug 152 depending from the underside of the plate 130. As shown in FIGURE 6 the stabilizer link 148 extends laterally of the assembly directly beneath the axis of the ball member 128. Thus this linkage system is effective to absorb both laterally and longitudinally directed loads without interfering with the free vertical movement of the chassis with respect to the bogie.

The cars 30 and 32 are suspended from the upper chassis sections by front and rear hanger arm assemblies 154 and 156, respectively, which are of identical construction. The hanger arm assemblies are formed integrally or welded to one end of the end chassis cross members 40 and 48, respectively, and project to one side of the chassis structure downwardly along the side of the track outwardly of the side guide wheels and are bifurcated to provide arms 158 and 160 which are rigidly attached by means not shown to the body structure of the cars 30 or 32 so as to dispose the center of gravity of the cars directly beneath the track. The hanger arms are enclosed in decorative sheet metal housings. It is a feature of the invention that by virtue of the above described construction all of the major forces produced by acceleration or deceleration of the vehicle or by a tendency of one of the bogies to overdrive the other as well as the forces arising from swaying or tilting movements are absorbed by the strong, rigid yet lightweight upper chassis construction. Accordingly, the main passenger or load carrying car sections 30 and 32 may be of lightweight construction since they need support only those loads which are imposed by gravity.

To provide further stabilization of the cars against lateral swaying or tilting movements, shock absorbers 166 are connected between each of the hanger arms 158 and 160 and the adjacent arms 72 and 74 of the bogies. As best shown in FIGURE 5, one end of the shock absorbers 166 is connected to the hanger arms for pivotal movement about a substantially vertical axis and the opposite end of the shock absorbers is connected to the bogie for pivotal movement about a substantially horizontal axis, thus providing a universal connection to permit the desired limited relative movement between the parts.

Similarly, a pair of shock absorbers 168 and 170 is operatively interposed between the plate 130 and the cross beam 40 outboard of the links 142a and 136a (FIGURE 6), and a further pair of shock absorbers 172 and 174 is operatively interposed between the plate 130 and the cross beam 40 outboard of the links 142 and 136 (FIGURE 4).

As is apparent from the foregoing detailed description, the load of the vehicle is transmitted from the cross beam 40 through the ball joint 122, the plate 130, and the air cushions 132 and 133 to the bogie frame. The expansible and contractible chambers 132a and 132b of the air cushions 132 and 133 are in fluid communication with the relatively large fixed volume interiors of air-tight tubes 135 and 134 respectively. Compression of the chambers 132a and 132b from their normal height will produce a substantially lesser than proportionate increase in the air pressure therein than if fluid communication with the fixed volume interior of tubes 134 and 135 were not provided. Thus, while the air cushions 132 and 133 will provide adequate load support when filled to their proper predetermined internal air pressure, they will absorb substantially greater compression under shock loads with resultant smoother running support for the cars 30 and 32. The rubber snubbers at the ends of the links 136, 142, 136a and 142a have sufficient resiliency and permit sufficient movement of the links relative to the lugs to which they are connected to permit the required vertical converging and diverging movements under shock load between plate 130 and the tubular members 134 and 135 so as not to inhibit the cushioning action of air cushions 132 and 133.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. A mono-rail vehicle adapted to travel along a track beam having a substantially horizontal top running surface and generally vertical side running surfaces comprising first and second unitary truck frame assemblies, wheels rotatably mounted on each of said truck frame assemblies for engagement with said track beam running surfaces, a pair of intermediate support assemblies, pneumatic means supporting one of said intermediate support assemblies from each of said first and second truck frame assemblies respectively, stabilizer means connecting one of said intermediate support assemblies and said first truck frame assembly for preventing relative horizontal movement of said one intermediate support assemblies with respect to said first truck frame assembly, stabilizer means connecting the other of said intermediate support assemblies with said second truck frame assembly for preventing relative horizontal movement of said other intermediate assembly with respect to said second truck frame assembly, a third unitary frame structure, means pivotally connecting said third frame structure at its opposite ends to said first and second intermediate support assemblies about centers at least as low as the plane defined by the rotation axes of the load support ones of said wheels, a coach assembly, and hanger arms rigid with said third frame assembly for suspending said coach therefrom.

2. A mono-rail vehicle adapted to travel along a track beam having a substantially horizontal top running surface and generally vertical side running surfaces comprising first and second unitary truck frame assemblies, wheels rotatably mounted on each of said truck frame assemblies for engagement with said track beam running surfaces, a pair of intermediate support assemblies, pneumatic means supporting one of said intermediate support assemblies from each of said first and second truck frame assemblies respectively, stabilizer means connecting one of said intermediate support assemblies and said first truck frame assembly for preventing relative horizontal movement of said one intermediate support assembly with respect to said first truck frame assembly, stabilizer means connecting the other of said intermediate support assemblies with said second truck frame assembly for preventing relative horizontal movement of said other intermediate assembly with respect to said second truck frame assembly, a third unitary frame assembly, means pivotally connecting said third frame assembly at its opposite ends to said first and second intermediate support assemblies, a coach assembly, and hanger arms rigid with said third frame assembly suspending said coach therefrom, said pneumatic means each embodying enclosed air chambers but a portion of each of which is vertically expansible.

3. A monorail vehicle adapted to travel along a track beam having a substantially horizontal top running surface and side running surfaces comprising first and second unitary truck frame assemblies, each truck frame assembly having a top portion extending over the top of said track for supporting load carrying wheels and each truck frame assembly having an arm portion extending from said top portion down along one side of said beam and under the bottom edge of said beam, lower side wheels carried by said arm portion for engagement with the opposite sides of the lower portion of said beam, a pair of intermediate support assemblies, air spring assemblies supporting one of said intermediate support assemblies on each of said first and second truck frame assemblies, respectively, stabilizer links connecting one of said intermediate support assemblies and said first truck frame assembly for preventing relative lateral movement of said one intermediate support assembly with respect to said first truck frame assembly, stabilizer links connecting the other of said intermediate support assemblies with said second truck frame assembly for preventing relative lateral movement of said other intermediate assembly with respect to said second truck frame assembly, a third unitary frame assembly, means connecting said third frame assembly at its opposite ends to said first and second intermediate support assemblies for pivotal movement about centers at least as low as the plane defined by the rotation axes of said load carrying wheels, a coach assembly, and hanger arms rigid with said third frame assembly for suspending said coach assembly therefrom.

4. In an overhead monobeam supported vehicle, a truck frame having support and guide wheels journalled thereon for rolling engagement with the support and guide surfaces of a monobeam, a vehicle frame having a portion overlying said truck frame in vertically spaced relation thereto, an intermediate support, vertically compressible air bags at each side of said truck frame operatively interposed between said intermediate support and said truck frame, said air bags being connected in fluid communication with an airtight fixed volume air container fixed to said truck frame and of substantial relative volume whereby vertical compression of said air bag will produce a less than proportionate increase in the fluid pressure in said air bag, a plurality of stabilizing links pivotally connected at their opposite ends to said frame and said intermediate support by rubber bushings and extending longitudinally of said truck frame for laterally and longitudinally stabilizing said intermediate support relative to said truck frame, means universally pivoting said vehicle frame to said intermediate support about a center disposed at a level no greater than that of the plane defined by the axes of said support wheels, and a sway bar extending transversely of said truck frame beneath the center of said universal pivot and pivotally connected at its opposite ends to said intermediate support member and said truck frame, respectively, by rubber snubbers.

References Cited in the file of this patent

UNITED STATES PATENTS

| | | |
|---|---|---|
| 1,422,394 | Wagner | July 11, 1922 |
| 1,469,997 | Cornwall | Oct. 9, 1923 |
| 1,544,263 | Montgomery | June 30, 1925 |
| 2,020,540 | Dunlap | Nov. 12, 1935 |
| 2,060,402 | Strauss | Nov. 10, 1936 |
| 2,274,016 | Verplanck | Feb. 24, 1942 |
| 2,691,420 | Fox et al. | Oct. 12, 1954 |

FOREIGN PATENTS

| | | |
|---|---|---|
| 535,447 | Canada | Jan. 8, 1957 |